United States Patent
Bevers

(10) Patent No.: US 9,641,207 B1
(45) Date of Patent: May 2, 2017

(54) SHADING AND COOLING APPARATUS FOR A CELLULAR PHONE

(71) Applicant: Lisa Bevers, Tucson, AZ (US)

(72) Inventor: Lisa Bevers, Tucson, AZ (US)

(*) Notice: Subject to any disclaimer, the term of this patent is extended or adjusted under 35 U.S.C. 154(b) by 0 days.

(21) Appl. No.: 15/233,513

(22) Filed: Aug. 10, 2016

(51) Int. Cl.
*H05K 7/20* (2006.01)
*H04B 1/3877* (2015.01)

(52) U.S. Cl.
CPC .................. *H04B 1/3877* (2013.01)

(58) Field of Classification Search
None
See application file for complete search history.

(56) References Cited

U.S. PATENT DOCUMENTS

| | | | |
|---|---|---|---|
| 5,230,016 A | 7/1993 | Yasuda | |
| 5,979,724 A | 11/1999 | Loewenthal, Jr. et al. | |
| 6,542,698 B2 | 4/2003 | Izawa | |
| 2014/0007594 A1* | 1/2014 | Lofy | H05K 7/20845 62/3.2 |
| 2014/0293538 A1* | 10/2014 | Han | H05K 7/20845 361/690 |

* cited by examiner

*Primary Examiner* — David Bilodeau
(74) *Attorney, Agent, or Firm* — Stevenson IP, LLC

(57) ABSTRACT

A shading and cooling apparatus for a cellular phone including a covering having an open bottom side and an open front side. A front lip is inwardly disposed within the open front side of the covering. A circular aperture is disposed through a rear side of the covering, and a slot is continuously disposed within the rear side of the covering from the aperture to a bottom edge of the rear side. A proximal end of a tube is attached to an interior surface of the rear side and a distal end of the tube is removably disposed within an interior air vent of an automobile. An arm extension of a windshield-mounted cellular phone holder is selectively and slidably disposed through the slot and within the aperture, and the covering is removably disposed around a cellular phone attached to the windshield-mounted cellular phone holder.

2 Claims, 4 Drawing Sheets

SHADING AND COOLING APPARATUS FOR A CELLULAR PHONE

BACKGROUND OF THE INVENTION

Various types of shading devices are known in the prior art. However, what has been needed is a shading and cooling apparatus for a cellular phone including a covering having an open bottom side and an open front side. What has been further needed is a front lip inwardly disposed within the open front side of the covering, a circular aperture disposed through a rear side of the covering, and a slot continuously disposed within the rear side of the covering from the aperture to a bottom edge of the rear side. Lastly, what has been needed is for a proximal end of a tube to be attached to an interior surface of the rear side and a distal end of the tube to be removably disposed within an interior air vent of an automobile. An arm extension of a windshield-mounted cellular phone holder is selectively and slidably disposed through the slot and within the aperture, and the covering is removably disposed around a cellular phone attached to the windshield-mounted cellular phone holder. The covering thus protects a cellular phone from overheating when mounted to a windshield-mounted cellular phone holder by both directing air from an interior air vent of an automobile to the cellular phone and protecting it from direct sunlight.

FIELD OF THE INVENTION

The present invention relates to shading devices, and more particularly, to a shading and cooling apparatus for a cellular phone.

SUMMARY OF THE INVENTION

The general purpose of the present shading and cooling apparatus for a cellular phone, described subsequently in greater detail, is to provide a shading and cooling apparatus for a cellular phone which has many novel features that result in a shading and cooling apparatus for a cellular phone which is not anticipated, rendered obvious, suggested, or even implied by prior art, either alone or in combination thereof.

To accomplish this, the present shading and cooling apparatus for a cellular phone includes a covering having a right side, a left side, a rectangular rear side, a rectangular top side, an open bottom side, and an open front side. Each of the right side, the left side, and the top side has a front edge and a rear edge, and each of the right side, the left side, and the rear side has a top edge and a bottom edge. A front lip is inwardly disposed within the open front side of the covering and continuously disposed from the bottom edge of the left side of the covering to the bottom edge of the right side of the covering. A circular aperture is substantially medially disposed through the rear side of the covering, and a slot is continuously disposed within the rear side of the covering from the aperture to the bottom edge. A height of the covering substantially conforms to a height of a cellular phone, and a length between the right side of the covering and the left side of the covering substantially conforms to a width of the cellular phone.

The shading and cooling apparatus for a cellular phone further includes a tube having a proximal end and a distal end. The proximal end is attached to an interior surface of the rear side of the covering proximal the slot, and the distal end is removably disposed within an interior air vent of an automobile. An arm extension of a windshield-mounted cellular phone holder is selectively and slidably disposed through the slot and within the aperture, and the covering is removably disposed around the cellular phone attached to the windshield-mounted cellular phone holder. The windshield-mounted cellular phone holder can include any of that type of cellular phone holder known in the art. The tube is configured to direct the passage of air from the interior air vent of the automobile through the tube and onto the cellular phone disposed within the covering.

It is envisioned that the covering can have a pair of layers including an exterior layer and an interior layer. The exterior layer is optionally paper, and the interior layer is optionally plastic. The inwardly disposed front lip is specifically structured to better secure the covering around the cellular phone, and each of the right side and the left side of the covering is optionally substantially triangular to better contain the cellular phone within the covering as well.

Thus has been broadly outlined the more important features of the present shading and cooling apparatus for a cellular phone so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
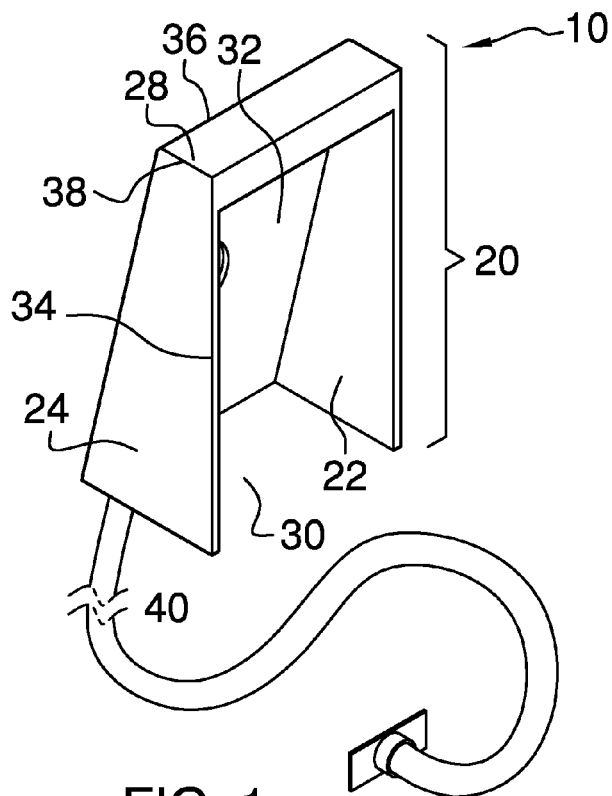
FIG. 1 is a front isometric view.
Figure 2:
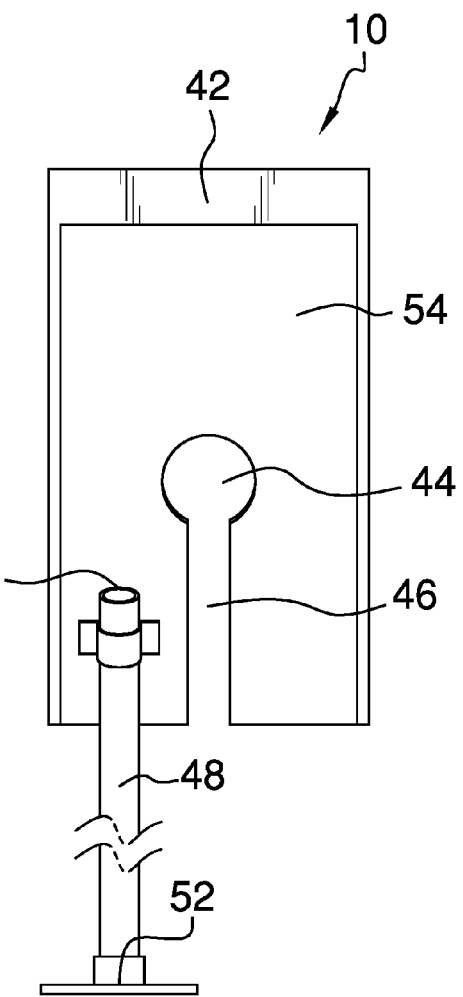
FIG. 2 is a front elevation view.
Figure 3:
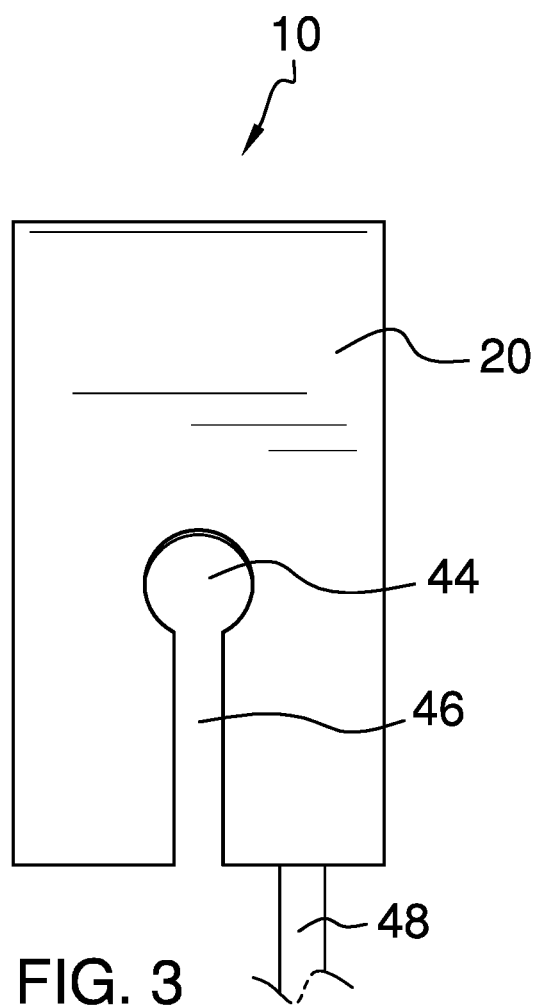
FIG. 3 is a rear elevation view.
Figure 4:
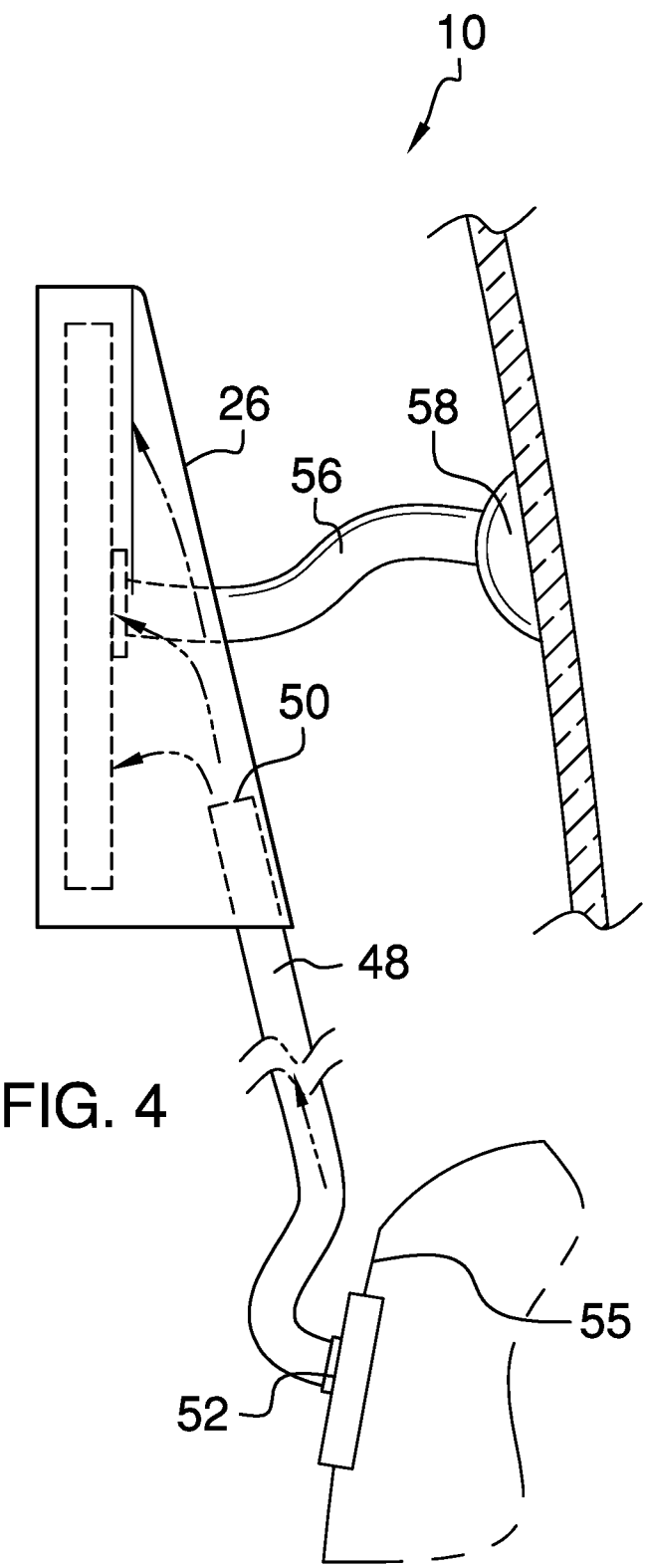
FIG. 4 is a side elevation view.
Figure 5:
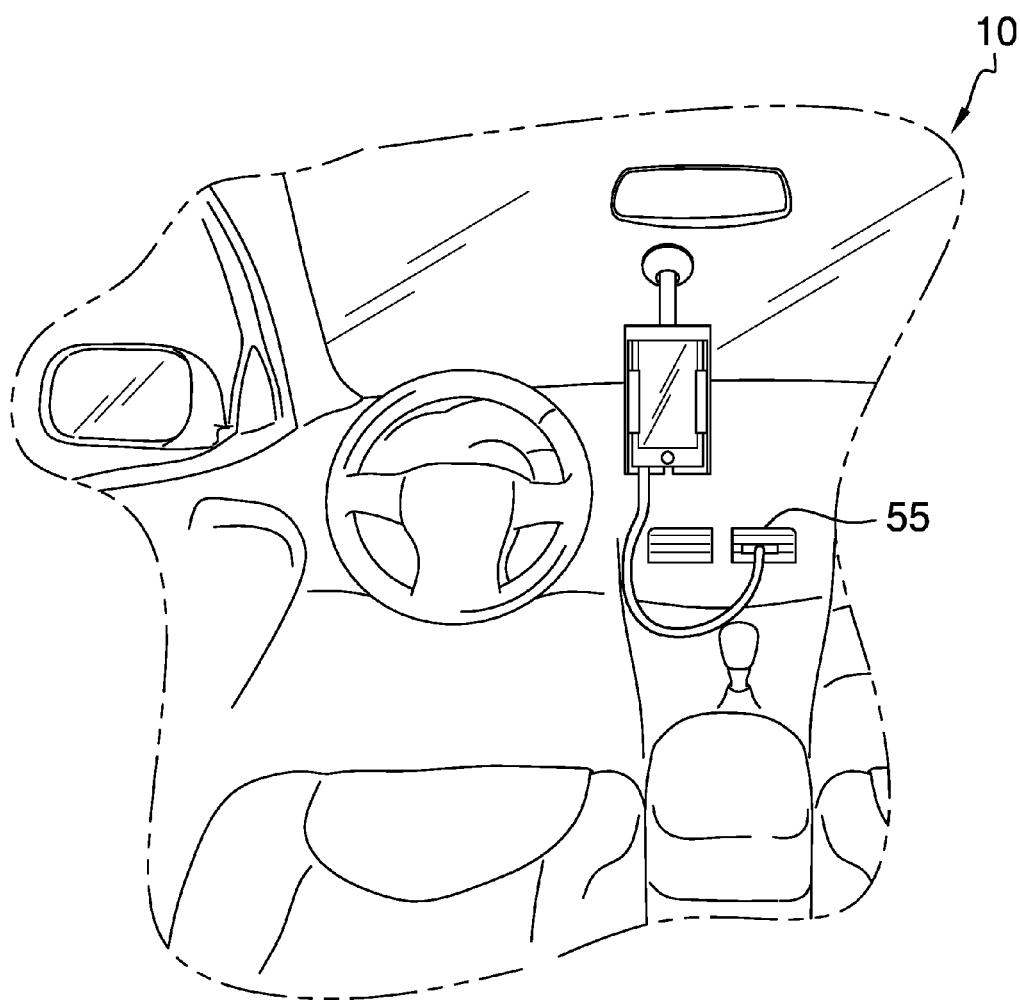
FIG. 5 is an in use view.

With reference now to the drawings, and in particular FIGS. 1 through 5 thereof, an example of the instant shading and cooling apparatus for a cellular phone employing the principles and concepts of the present shading and cooling apparatus for a cellular phone and generally designated by the reference number 10 will be described.

Referring to FIGS. 1 through 5 the present shading and cooling apparatus for a cellular phone 10 is illustrated. The shading and cooling apparatus for a cellular phone 10 includes a covering 20 having a right side 22, a left side 24, a rectangular rear side 26, a rectangular top side 28, an open bottom side 30, and an open front side 32. Each of the right side 22, the left side 24, and the top side 28 has a front edge 34 and a rear edge 36, and each of the right side 22, the left side 24, and the rear side 26 has a top edge 38 and a bottom edge 40. A front lip 42 is inwardly disposed within the open front side 32 of the covering 20 and continuously disposed from the bottom edge 40 of the left side 24 of the covering 20 to the bottom edge 40 of the right side 22 of the covering 20. A circular aperture 44 is substantially medially disposed through the rear side 36 of the covering 20, and a slot 46 is continuously disposed within the rear side 36 of the covering 20 from the aperture 44 to the bottom edge 40. A height of the covering 20 substantially conforms to a height of a cellular phone, and a length between the right side 22 of the covering 20 and the left side 24 of the covering 20 substantially conforms to a width of the cellular phone.

The shading and cooling apparatus for a cellular phone 10 further includes a tube 48 having a proximal end 50 and a distal end 52. The proximal end 50 is attached to an interior surface 54 of the rear side 26 of the covering 20 proximal the slot 46, and the distal end 52 is removably disposed within an interior air vent of an automobile 55. An arm extension 56 of a windshield-mounted cellular phone holder 58 is selectively and slidably disposed through the slot 46 and within the aperture 44, and the covering 20 is removably disposed around the cellular phone attached to the windshield-mounted cellular phone holder 58.

What is claimed is:

1. A shading and cooling apparatus for a cellular phone comprising:
    a covering having a right side, a left side, a rectangular rear side, a rectangular top side, an open bottom side, and an open front side, each of the right side, the left side, and the top side having a front edge and a rear edge, each of the right side, the left side, and the rear side having a top edge and a bottom edge;
    a front lip inwardly disposed within the open front side of the covering, wherein the front lip is continuously disposed from the bottom edge of the left side of the covering to the bottom edge of the right side of the covering;
    a circular aperture substantially medially disposed through the rear side of the covering;
    a slot continuously disposed within the rear side of the covering from the aperture to the bottom edge;
    wherein a height of the covering substantially conforms to a height of a cellular phone;
    wherein a length between the right side of the covering and the left side of the covering substantially conforms to a width of the cellular phone;
    a tube having a proximal end and a distal end, wherein the proximal end is attached to an interior surface of the rear side of the covering proximal the slot and the distal end is removably disposed within an interior air vent of an automobile;
    wherein an arm extension of a windshield-mounted cellular phone holder is selectively and slidably disposed through the slot and within the aperture;
    wherein the covering is removably disposed around the cellular phone attached to the windshield-mounted cellular phone holder;
    wherein the tube is configured to direct the passage of air from the interior air vent of the automobile through the tube and onto the cellular phone disposed within the covering.

2. The shading and cooling apparatus for a cellular phone of claim 1 wherein each of the right side and the left side of the covering is substantially triangular.

\* \* \* \* \*